United States Patent [19]

Wachter

[11] Patent Number: 4,523,352
[45] Date of Patent: Jun. 18, 1985

[54] HOSE CLIP

[75] Inventor: Gerhard Wachter, Büdingen, Fed. Rep. of Germany

[73] Assignee: Rasmussen GmbH, Maintal, Fed. Rep. of Germany

[21] Appl. No.: 531,929

[22] Filed: Sep. 13, 1983

[30] Foreign Application Priority Data

Sep. 24, 1982 [DE] Fed. Rep. of Germany ....... 3235329

[51] Int. Cl.³ ............................................. B65D 63/02
[52] U.S. Cl. .............................. 24/20 TT; 24/20 CW; 24/274 R
[58] Field of Search ............ 24/20 R, 20 CW, 20 EE, 24/20 TT, 20 W, 20 ST, 20 S, 23 W, 23 EE, 17 AP, 274 R, 269, 279, 22, 275, 277; 339/251

[56] References Cited

U.S. PATENT DOCUMENTS

| 712,765 | 11/1902 | Cole | 24/20 TT |
|---|---|---|---|
| 907,542 | 12/1908 | Vogel | 24/20 LS |
| 1,053,684 | 2/1913 | Vogel | 339/251 |
| 1,379,476 | 5/1921 | Parr | 24/20 CW |
| 1,441,154 | 1/1923 | Johnson | 24/20 TT |
| 1,479,317 | 1/1924 | Peirce | 24/275 |
| 1,804,725 | 5/1931 | Walker | 24/20 TT |
| 2,374,541 | 4/1945 | Hartman | 24/20 TT |
| 3,293,709 | 12/1966 | Holton | 24/20 TT |
| 3,361,403 | 1/1968 | Oeler et al. | 24/279 |
| 4,237,588 | 12/1980 | Rasmussen et al. | 24/274 R |
| 4,244,088 | 1/1981 | Sauer | 24/274 R |
| 4,275,484 | 6/1981 | Irio et al. | 24/20 R |
| 4,300,270 | 11/1981 | Sauer | 24/274 R |

FOREIGN PATENT DOCUMENTS 2028347 12/1971 Fed. Rep. of Germany ........ 24/279
3010424 9/1981 Fed. Rep. of Germany .

Primary Examiner—Victor N. Sakran
Attorney, Agent, or Firm—Peter K. Kontler

[57] ABSTRACT

A hose clip which can be tightened without a screw has an elongated band with a first end section which is formed with a closed slot for threading of the second end section therethrough. The end portion of the first end section has a pallet which engages one of a series of external teeth on the second end section to hold the band against expansion when the band surrounds and is tightened around an elastic hose. The end portion of the first end section extends radially outwardly and abuts against a back support which is an integral part of the first end section and is formed by looping the first end section radially outwardly adjacent to its end portion. The provision of the back support on the first end section enhances the versatility of the hose clip by enabling it to properly clamp smaller- or larger-diameter hoses without affecting the ability of the end portion of the first end section to remain in proper engagement with a selected tooth of the second end section. The teeth of the second end section form a row extending in the longitudinal direction of the band.

13 Claims, 3 Drawing Figures

HOSE CLIP

BACKGROUND OF THE INVENTION

The present invention relates to hose clips in general, and more particularly to improvements in hose clips of the type wherein the tensioning of the band around a hose or the like need not be effected by resort to a threaded tightening element. Still more particularly, the invention relates to improvements in hose clips or pipe clamps of the type wherein one end section of the band has an opening for the other end section and the opening constitutes a closed slot.

It is already known to provide that (second) end section of the band in a hose clip which extends through the slot of the other (first) end section with teeth or analogous detent elements which can be engaged by a bent-over portion of the first end section in order to hold the band against expansion in response to the tendency of the confined hose or another component to increase the diameter of the band. It is also known to provide such hose clips with back supports for the bent-over portion of the first end section in order to enable the bent-over portion to more raadily withstand the tendency of the confined hose or the like to expand the band.

In accordance with a prior proposal, the back support is constituted by the end portion of the second end section, and the detent elements constitute undulated parts of such end portion. The bent-over portion of the first end section extends into one of the valleys between neighboring hills of the undulated portion. The selection of that valley which is to receive the bent-over portion of the first end section depends upon the magnitude of radial force which acts upon the bent-over portion. The range of diameters of the band (i.e., the dimensions of components which can be properly clamped by hose clips employing such bands) depends upon the rather slight degree of inclination of the end portion of the second end section. As a rule, the bending stresses to which the end portion of the second end section of the band in such a hose clip is subjected increases with increasing diameter of the clamped commodity. This means that the material of the band must stand very pronounced bending stresses if the hose clip which is configured in the just described manner is to stand relatively large bending stresses while surrounding a portion of a large-diameter hose or the like. In the absence of the ability of their material to stand pronounced bending stresses, the usefulness of such hose clips is limited to a relatively small number of applications. For example, the hose clips cannot be applied around the end portions of large-diameter hoses which serve to convey fluids at an elevated pressure. The above proposal is disclosed in German patent application No. 30 10 424.

Hose clips with tightening means in the form of screws are disclosed in commonly owned U.S. Pat. Nos. 4,237,588, 4,244,088 and 4,300,270.

OBJECTS AND SUMMARY OF THE INVENTION

An object of the invention is to provide a novel and improved hose clip which need not employ a threaded tightening element but can stand pronounced stresses which tend to expand its band when the hose clip is in use.

Another object of the invention is to provide a hose clip whose band need not be made of an expensive highly stress-resistant material but the clip is still capable of adequately clamping hoses or analogous parts whose diameters vary within a wide range.

A further object of the invention is to provide a hose clip wherein the end sections of the band are configurated and capable of cooperating in a novel and improved way.

An additional object of the invention is to provide a hose clip which can be tightened around the end portion of an elastically deformable hose or the like by resorting to readily available rudimentary tools.

Still another object of the invention is to provide the hose clip with a novel and improved back support for the end portion of the first end section of the band.

Another object of the invention is to provide a novel and improved method of propping the end portion of the first end section of the band while such end portion engages the detent means of the second end section.

The invention is embodied in an annular hose clip which comprises an elongated flexible band whose inner side can be placed around a portion of an elastically deformable hose or a like expandable component. The band is of finite length and has a first and a second end section. The first end section has an end portion, a closed slot and a substantially radially outwardly extending back support between the slot and the end portion. The second end section extends through the slot of the first end section and has detent means engaged by the end portion of the first end section and urging the end portion of the first end section against the back support in response to the tendency of the component which is surrounded by band to expand the clip when the latter is tightly applied against such component. The detent means preferably includes a series of detent elements which are disposed one behind the other, as considered in the longitudinal direction of the band, and only one detent element is in engagement with the end portion of the first end section at any time. The other detent elements can be used when the band is to be applied around a larger or smaller elastically deformable component. The end portion of the first end section preferably extends substantially radially of the band.

The first end section is preferably provided with an outwardly looped intermediate portion which comprises or constitutes the back support and is integral with the end portion. Such end portion preferably extends radially inwardly toward the detent means, and the back support is preferably provided with a substantially radially extending exposed surface which abuts against the end portion of the first end section when the latter engages with and is urged by the detent means against the back support.

The first end section preferably further comprises an elongated tongue which is overlapped by the second end section. The slot is disposed between the tongue and the back support, and such tongue can constitute an integral portion of the first end section by being bent out of the slot subsequent to the making of a substantially U-shaped slit in the material of the first end section. The second end section can be formed with an elongated groove which is provided in the inner side of the band and receives the tongue of the first end section. The groove preferably constitutes a depression in the inner side of the band and its formation entails the formation of an outwardly extending ridge or an analogous protuberance opposite the depression.

The end portion of the first end section is preferably formed with a tip resembling or constituting a pallet and being bent away from the back support, as considered in the circumferential direction of the band. Furthermore, the end portion is preferably formed with a substantially convex surface which is adjacent to the tip and abuts against the back support, at least when the confined component causes the detent means of the second end section to exert pressure against the end portion so that the latter is urged against the back support.

The detent means can be formed by bending at least one of the two marginal portions of the second end section outwardly and away from the overlapped first end section and by providing such marginal portion or portions with a series of teeth each of which forms part of a discrete detent element. If each of the two marginal portions of the second end section is serrated, the teeth of one marginal portion register with the teeth of the other marginal portion and each pair of registering teeth constitutes one of the detent elements.

The looped intermediate portion or back support of the first end section has two neighboring panels each of which is provided with an additional opening for the passage of the second end section therethrough. This intermediate portion is preferably looped in such a way that it has a throat adjacent to the detent means and that it expands in a direction radially outwardly from the throat, i.e., the width of the intermediate portion increases in a direction as considered circumferentially of the band.

The novel features which are considered as characteristic of the invention are set forth in particular in the appended claims. The improved hose clip itself, however, both as to its construction and the mode of using the same, together with additional features and advantages thereof, will be best understood upon perusal of the following detailed description of certain presently preferred embodiments with reference to the accompanying drawing.

BRIEF DESCRIPTION OF THE DRAWING

FIG. 1 is a fragmentary perspective view of a hose clip with the end portion of the first end section in engagement with one of the detent elements of the second end section and further showing a portion of a tool which can be used to tighten the clip around a hose or the like;

DESCRIPTION OF THE PREFERRED EMBODIMENTS

Figure 1:
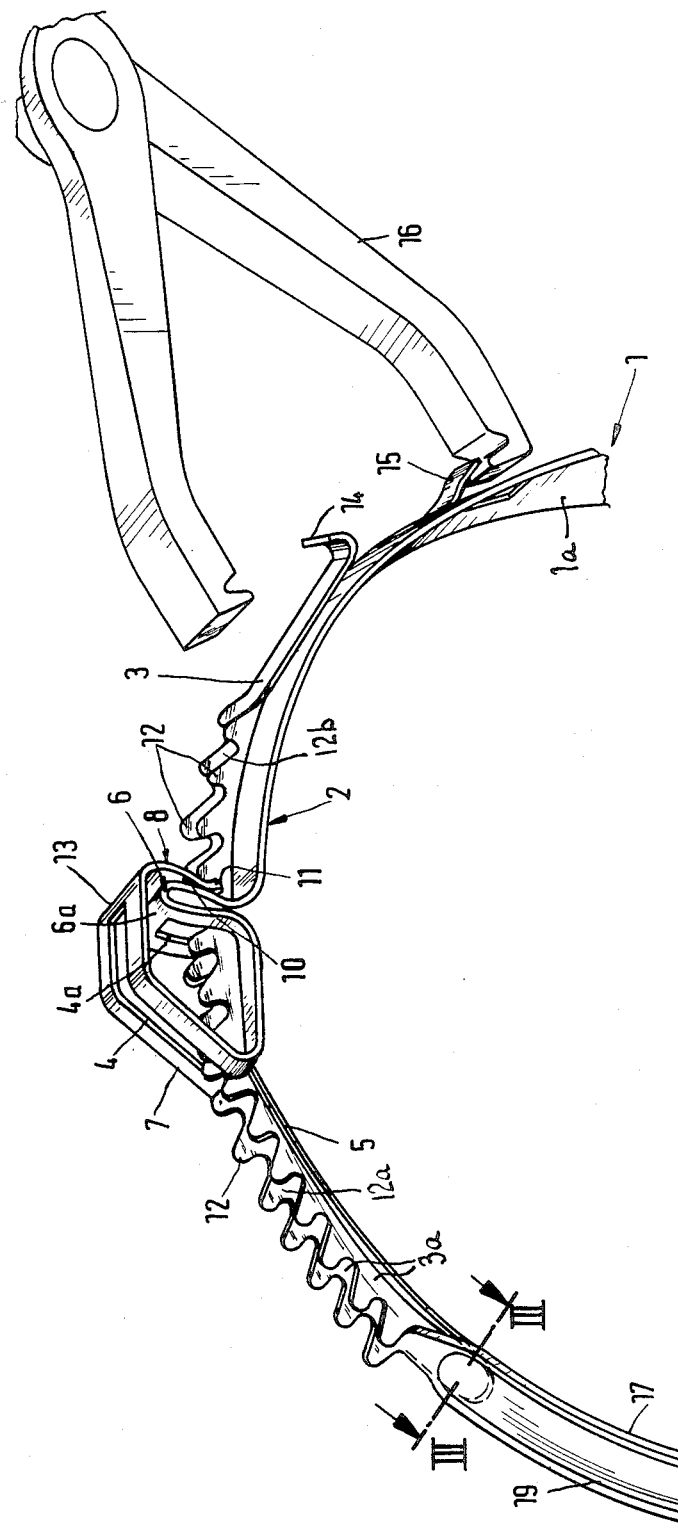

The hose clip which is shown in FIG. 1 comprises an elongated band or strip 1 which is made of a resilient metallic or plastic material, preferably spring steel or a metal having similar properties. The band 1 comprises a first end section 2 having an opening 4 in the form of an elongated closed slot and a second end section 3 which extends through the slot 4 so that its outermost part overlies the adjacent part of the section 2. The slot 4 is obtained by providing the end section 2 with a U-shaped slit and by bending the material within the slit outwardly and forwardly so that the material which has filled the slit forms a tongue 5 extending in a direction away from the free end of the section 3. The aforementioned slit has two longitudinally extending parallel legs and a transversely extending portion. As can be seen in FIG. 1, the tongue 5 extends from that end of the slot 4 which is remote from the transversely extending portion of the just discussed slit.

Figure 2:
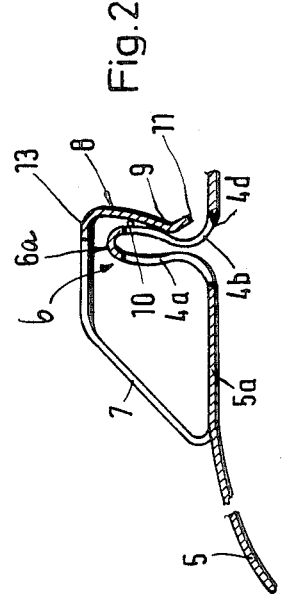
FIG. 2 is a fragmentary longitudinal sectional view of the two end sections of the band.

That part (7) of the end section 2 which is rearwardly adjacent to the tongue 5 is bent over itself so that the major part of the slot 4 is disposed radially outwardly of the end section 3 which extends through the radially innermost part of the slot. The part 7 overlies a looped portion 6 of the end section 2, and such looped portion constitutes a back support for the end portion 8 of the end section 2. It will be noted that the looped back support 6 is disposed between the opening 4 and the end portion 8 of the end section 2. The end portion 8 has an arcuate tip 11 which is adjacent to a convex surface 9 of the end portion 8, and such convex surface 9 abuts against a radially outwardly extending exposed surface 10 of the back support 6 (see particularly FIG. 2). The end portion 8 constitutes the outermost portion of the part 7, i.e., of that part which is formed with the slot 4 for the second end section 3. FIG. 2 shows that the looped back support 6 has a throat which is the radially innermost portion of the back support and that the back support 6 widens (as considered in the circumferential direction of the annular band 1) radially outwardly from such throat.

The detent means of the end section 3 comprises a series of successive detent elements 12 in the form of pairs of teeth forming part of suitably shaped and deformed marginal portions 3a of the end section 3. The tip 11 of the end portion 8 of the end section 2 constitutes a pallet which engages with the substantially radially outwardly extending flanks 12a of the adjacent pair of teeth. The flanks 12a slope outwardly and rearwardly, as considered in a direction from the foremost part toward the remaining part of the section 3.

In making the pairs of teeth, the marginal portions 3a of the end section 3 are provided with alternating hills and valleys, and the marginal portions 3a are bent radially outwardly so that the distance between the planes of the thus bent marginal portions 3a is less than the width of the slot 4. This renders it possible to insert the end section 3 through the slot 4 of the end section 2. Each hill or tooth of one marginal portion 3a is in register with a hill or tooth of the other marginal portion 3a, and the thus obtained pairs of registering hills or teeth constitute successive detent elements 12 of the aforementioned series.

The looped band support 6 has two panels or walls which extend radially outwardly from the adjacent part of the end section 2 and are provided with aligned additional openings or closed slots 4a and 4b serving to permit passage of the end section 3 therethrough. When the end sections 2 and 3 are to be interfitted in a manner as shown in FIG. 1, the leader of the end section 3 is first introduced through the longer slot 4 and thereupon through and beyond the additional slots 4a and 4b in such order. The radially outermost portion 6a of the back support constitutes a web which overlies the inserted end section 2 in the region between the additional slots 4a and 4b. Such web 6a is disposed radially inwardly of the junction 13 between the slotted portion 7 and the end portion 8 of the end section 2. The elasticity of the end section 2 is sufficiently pronounced to allow for temporary flexing of the end section 2 in the region of the junction between the tongue 5 and part 7 and/or in the region of the junction 13 so as to allow for disengagement of the tip 11 of the end portion 8 from the adjacent flanks 12a. This renders it possible to increase the diameter of the annular band 1, i.e., this allows for disengagement of the inner side 1a of the band 1 from the external surface of a hose or the like, not shown. Furthermore, extraction of the tip 11 from the adjacent valley between two neighboring detent elements 12 is necessary when the diameter of the annular band 1 is to be increased in order to cause the band to surround a larger-diameter portion of the hose. During tightening of the band 1 around a hose (which is slipped onto a nipple, onto the end portion of a rigid pipe or the like), i.e., while the leader of the end section 3 is moved lengthwise in a direction to reduce the diameter of the band 1, the tip 11 of the end portion 8 rides over the detent elements 12 not unlike the pallet of a pawl rides over the teeth of a ratchet wheel, i.e., the tip 11 does not offer an excessive resistance to a reduction of the diameter of the band 1. Such ratcheting of the tip 11 entails a flexing of the junction 13 and/or of the junction between the part 7 and the tongue 5 of the end section 2. The inclination of the rear flanks 12b of the detent elements 12 facilitates ratcheting of the tip 11 when the leader of the end section 3 is caused to move in a direction to the right, as viewed in FIG. 1.

In order to facilitate tightening of the band 1 around a hose or the like, the leader of the end section 3 is formed with a hook 14 and the end section 2 is formed with a hook 15. These hooks can be engaged by the jaws of tongs, pliers 16 or another suitable tool to move them toward each other and to thereby cause the end sections 2, 3 to slide along one another in a direction to reduce the diameter of the band 1. The hook 14 is the bent-over foremost part of the leader of the end section 3, and the hook 15 is formed in a manner similar to that described above for the tongue 5, i.e., the end section 2 is formed with a U-shaped slit and the material within such slit is bent slightly outwardly to form the hook 15. It will be noted that the hook 15 is formed in that portion of the end section 2 which is not overlapped by the end section 3.

Figure 3:
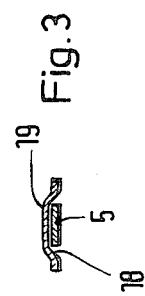
FIG. 3 is a transverse sectional view as seen in the direction of arrows from the line III—III of FIG. 1.

The tongue 5 of the end section 2 extends into a groove 18 which is formed in the inner side of the end section 3 (see FIG. 3). This groove is obtained by deforming the material of the band 1 so that the groove constitutes a depression located opposite a protuberance 19 at the outer side of the respective portion 17 of the end section 3. The portion 17 is inwardly adjacent to the portion which is formed with detent elements 12, i.e., these detent elements are disposed between the hook 14 and the groove 18.

When the hose clip of FIGS. 1 to 3 is put to use, the band 1 is placed around a portion of an elastically deformable hose (preferably around a portion of the hose which surrounds a rigid nipple or pipe) and the leader of the end section 3 is threaded through the slots 4, 4a and 4b so that the hook 14 is adjacent to but still spaced apart from the hook 15 of the end section 2. The tip 11 of the end portion 8 rides over successive detent elements 12 by sliding along the strongly inclined rear flanks 12b. The final tensioning or tightening can be achieved by resorting to the tool 16 or an analogous tool. Once the tightening step is completed, the end portion 8 extends into a tooth space or valley between two neighboring detent elements 12 and holds the end sections 2 and 3 against slippage relative to one another in the longitudinal direction of the band 1. The hose tends to expand and to move the end sections 2 and 3 radially outwardly; however, such movement is prevented by the end portion 8 whose convex surface bears against the radially extending surface 10 of the back support 6.

If the leader of the end section 3 is urged radially outwardly (i.e., away from the adjacent outer side of the end section 2), such movement of the leader of the end section 3 is opposed by the restoring force of the part 7 which tends to remain in the position shown in FIGS. 1 and 2. Moreover, the convex surface 9 of the end portion 8 preferably engages the concave part of the exposed surface 10 in the region of the additional slot 4b so that such surfaces cooperate to oppose the movement of the adjacent (serrated) portion of the end section 3 radially outwardly and away from the portion 4d of the end section 2. Frictional engagement between the concave portion of the surface 10 and the convex surface 9 becomes more pronounced with increasing tendency of the surrounded hose to expand, i.e., the ability of the back support 6 to oppose outward movement of the end portion 8 along the exposed surface 10 increases with an increase of the force which a detent element 12 exerts upon the outer side of the end portion 8 of the end section 2. If the force with which the hose tends to expand increases still further and the tip 11 of the end portion 8 is ultimately disengaged from the adjacent detent element 12, the latter engages the web 6a of the back support 6 and cooperates directly with the back support to prevent opening of the hose clip, i.e., to prevent the hook 14 from moving away from the hook 15.

An advantage of the improved hose clip is that the length of the series of detent elements 12 can be selected practically at will, i.e., the band 1 can be placed around a small-diameter hose or around a large-diameter hose without affecting the ability of the end portion 8 and of a selected detent element 12 to oppose an increase of the diameter of the band. The range of diameters of hoses which can be engaged by the improved hose clip depends solely on the selected length of the end section 3 and on the selected length of the series of detent elements 12 thereon. Once the end portion 8 is caused or permitted to engage a selected detent element 12, the position of the end portion 8 (as considered radially of the band 1) remains unchanged irrespective of the magnitude of forces which tend to increase the diameter of the band 1, as long as the end portion 8 and the selected detent element 12 can stand such stresses without undergoing deformation which would enable the confined component to expand the band 1 by increasing its diameter. The lever arm of the force with which the end portion 8 bears against the back support 6 is the same regardless of whether the diameter of the confined hose is large or small. Consequently, if the radial force which tends to increase the diameter of the band 1 is the same in the case of a small-diameter or a large-diameter hose, the bending moment which is applied to the end portion 8 and to its back support 6 is also the same. In other words, the resistance which the end portion 8 and the back support 6 offer to bending stresses can be selected as a function of the smallest lever arm irrespective of the diameter of the hose, i.e., irrespective of the diameter of the band 1.

The making of the back support 8 in the form of an outwardly looped portion of the end section 2 behind the end portion 8 exhibits the advantage that the two panels of the back support reinforce (stiffen) each other and thus enhance the ability of the back support to resist the force which is applied thereto by the end portion 8 when the latter engages one of the detent elements 12 and the confined hose tends to increase the diameter of the band 1. The two panels of the back support 6 are disposed one behind the other, as considered in the circumferential direction of the band 1; this is desirable because such panels offer a much greater resistance to the forces which are applied by the end portion 8 than a single panel.

The tongue 5 exhibits the advantage that it allows for guidance of the end section 3 during threading through the slots 4, 4a and 4b of the end section 2. Moreover, the tongue 5 constitutes a bridge in the region (at the radially innermost portion 5a of the part 7) where the end section 3 enters the slot 4, i.e., such tongue prevents the formation of a step extending axially across the full width of the end section 2 in the region where the latter starts to be overlapped by the end section 3. The existence of such uninterrupted step could interfere with rapid threading of the end section 3 through the slots 4, 4a and 4b of the end section 2. The provision of the groove 18 for the tongue 5 serves an analogous purpose i.e., such groove prevents the establishment of a step extending axially all the way across the band 1 at the tip of the tongue 5. The prevention of development of steps all the way across the band 1 is desirable on the additional ground that the inner side 1a of the band should be in continuous contact with the entire peripheral surface of the surrounded hose. This results in more uniform distribution of clamping forces which are exerted by the tightened band 1 and in more uniform distribution of expanding forces which are exerted by the deformed hose and tend to increase the diameter of the band.

The bending of the tip 11 in the illustrated manner (so that its inner side has a convex surface or a surface merging into the convex surface 9 of the end portion 8) is advantageous because such tip acts not unlike a pallet and is more likely to ride over the crests of the detent elements 12 when the end section 3 is threaded through the slots 4, 4a and 4b of the end section 2 as well as when the hooks 14 and 15 are engaged by the jaws of a tool to reduce the diameter of the band 1 and to thereby clamp the surrounded hose.

The improved hose clip is susceptible of many modifications without departing from the spirit of the invention. For example, the illustrated detent elements 12 can be replaced with detent elements resembling the hook 15, i.e., by forming the end section 3 with a series of substantially U-shaped slits and by bending the material within the slits outwardly so that such material constitutes a series of teeth having flanks corresponding generally to those shown at 12a and 12b. This enables the end portion 8 to ride over the teeth during threading of the end section 3 through the slots 4, 4a and 4b of the end section 2 and to properly engage with the adjacent tooth when the clamped hose tends to expand the band. Alternatively, the detent elements 12 can be replaced with detent elements in the form of protuberances which are obtained by simply deforming the material of the end section 3 at a series of successive locations not unlike the formation of the protuberance 19 opposite the groove 18 of the end section 3. It is also possible to form the end section with a series of holes and to bend the material around each hole outwardly so that such material constitutes a detent element which can be engaged by the end portion 8 or by a suitably deformed or configured part of the end portion 8.

The illustrated mode of making the detent elements 12 by suitable shaping and bending of the marginal portions 3a of the end section 3 is preferred at this time because the procedure is simple and inexpensive and the pairs of teeth which constitute the detent elements 12 can offer a pronounced resistance to deformation in response to the tendency of the confined hose to undergo radial expansion. Furthermore, the illustrated inclination of the flanks 12a and 12b ensures that the end portion 8 of the end section 2 can ride over the detent elements 12 during threading of the end section 3 through the slots 4, 4a, 4b and during subsequent tightening of the band 1, as well as that the end portion 8 can properly engage and remain in proper engagement with the flanks 12a of a selected detent element 12 when the tightening of the band 1 is completed.

The part 7 can constitute a separately manufactured element which is permanently secured to the end section 2 by spot welding or the like. The same applies for the back support 6, i.e., the latter can constitute a separately produced part which is secured to the end section 2 by spot welding or in another suitable way so that, for all practical purposes, the thus secured back support constitutes an integral part of the end section 2. It is equally possible to replace the three discrete slots 4, 4a and 4b of the end section 2 with a single elongated closed slot, i.e., to eliminate the webs 5a and 6a (the tongue 5 is then integral with and extends rearwardly from the portion 4d of the end section 2 and extends across the gap between the innermost portions of the two panels of the back support). The web 6a constitutes a safety feature because it can intercept the adjacent detent element 12 if the end portion 8 is pushed or pulled radially outwardly so that it becomes disengaged from the adjacent flanks 12a. Furthermore, the web 6a stiffens the looped back support 6 so that the latter offers a more satisfactory resistance to deformation in response to the force which is exerted by the end portion 8. The feature that the back support 6 constitutes a looped portion of the end section 2 is advantageous and desirable because the portion of the exposed surface 10 adjacent to the throat of the loop is concave and can be readily engaged by and held in adequate frictional engagement with the convex surface 11 of the end portion 8. As mentioned above, frictional engagement between such surfaces becomes more pronounced with increasing tendency of the end portion 8 to slide radially outwardly along the adjacent panel of the back support 6.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An annular hose clip, comprising an elongated flexible band having an inner side arranged to surround a portion of an elastically deformable component, a first end section and a second end section, said first end section having an end portion, a slot and an outwardly looped intermediate portion integral with said end portion and defining a substantially radially outwardly extending back support in the region of said end portion and said slot, said second end section extending through said slot and having detent means engaged by said end portion and urging the latter against said back support in response to the tendency of the surrounded component to expand the band when the latter is tightly applied therearound, said end portion of said first end section extending substantially radially inwardly toward said detent means and said back support having a substantially radially extending exposed surface abutting against said end portion when the latter engages with and is urged by the detent means against said back support.

2. The hose clip of claim 1, wherein said detent means includes a series of detent elements disposed one behind the other, as considered in the longitudinal direction of said band, one of said detent elements being in engagement with said end portion.

3. The hose clip of claim 1, wherein said first end section further comprises an elongated tongue which is overlapped by said second end section, said slot being disposed between said tongue and said back support.

4. The hose clip of claim 3, wherein said tongue is bent out of said slot subsequent to the making of a substantially U-shaped slit in the material of said first end section.

5. The hose clip of claim 4, wherein said second end section has an elongated groove provided in said inner side and said tongue extends into said groove.

6. The hose clip of claim 5, wherein said groove is a depression in said inner side and said band has an outwardly extending protuberance opposite said depression.

7. The hose clip of claim 1, wherein said end portion has a tip which is bent away from said back support, as considered in the circumferential direction of said band.

8. The hose clip of claim 7, wherein said end portion has a substantially convex surface adjacent to said tip and abutting against said back support.

9. The hose clip of claim 1, wherein said detent means includes a series of detent elements disposed one behind the other, as considered in the circumferential direction of the band, and having flanks engageable with said end portion and extending outwardly from said second end section in a direction away from the free end of said second end section.

10. The hose clip of claim 9, wherein said second end section has a marginal portion extending outwardly from the first end section and provided with a row of teeth each forming part of one of said detent elements.

11. The hose clip of claim 9, wherein said second end section has two marginal portions extending outwardly from the first end section and provided with rows of teeth, the teeth of one of said rows being in register with the teeth of the other of said rows and each pair of registering teeth constituting one of said detent elements.

12. The hose clip of claim 1, wherein said intermediate portion has two neighboring panels each having an additional slot, said second end section extending through the additional slots of said panels.

13. The hose clip of claim 1, wherein said, said intermediate portion has a throat which is adjacent to said second end section and said intermediate portion expands in a direction substantially radially outwardly and away from said throat, as considered in the circumferential direction of said band.

* * * * *